United States Patent

[11] 3,604,809

| [72] | Inventor | Herman De Weerd<br>Arlington, Mass. |
| --- | --- | --- |
| [21] | Appl. No. | 804,799 |
| [22] | Filed | Mar. 6, 1969 |
| [45] | Patented | Sept. 14, 1971 |
| [73] | Assignee | Block Engineering, Inc.<br>Cambridge, Mass. |

[54] INTERFEROMETER-SPECTROMETER BRAKE
3 Claims, 3 Drawing Figs.

| [52] | U.S. Cl. | 356/106 |
| --- | --- | --- |
| [51] | Int. Cl. | G01b 9/02 |
| [50] | Field of Search | 356/106, 113 |

[56] References Cited
UNITED STATES PATENTS

| 3,517,781 | 6/1970 | DeWeerd | 188/54 |
| --- | --- | --- | --- |
| 967,166 | 8/1910 | Brandt | 74/18.24 |
| 3,286,582 | 11/1966 | Mertz | 356/106 |
| 3,488,123 | 1/1970 | Nichols | 356/106 |

*Primary Examiner*—Ronald L. Wibert
*Assistant Examiner*—Conrad Clark
*Attorney*—Robert J. Schiller ABSTRACT: An improved interferometer-spectrometer of the Michelson moving mirror type in which the mirror system is provided with a brake comprising a dashpot having two exit passageways for its working fluid. The dashpot also includes a rolling, everted flexible seal between the cylinder and piston, one of the exit passageways terminating in a port that is coverable by the seal at some position in the rolling travel of the seal.

PATENTED SEP 14 1971

3,604,809

HERMAN De WEERD
INVENTOR.

BY Robert J. Schiller

ATTORNEY.

INTERFEROMETER-SPECTROMETER BRAKE

This invention relates to interferometer-spectrometers, and particularly to the drive system for such instruments.

Interferometer-spectrometers are known devices employing interferometric phenomena to achieve spectral analysis, and their theory and structure has been described in *Transformations in optics*, L. Mertz, John Wiley & Sons, Inc., New York 1965. The more widely used devices of this type have structures based upon well-known Michelson interferometer wherein two plane mirrors are disposed orthogonally to one another and a beam splitter placed at an angle between the mirrors. Light is then sent to both mirrors by the beam splitter and reconverges at the latter to form an exit beam. Where waves of the two combined are in phase, their amplitudes are summed; and if out of phase, the amplitudes cancel, creating interference patterns. Now by moving one mirror normally to its plane, the retardation is modulated, i.e. for each quarter wavelength of mirror travel, there is a switch between constructive and destructive interference of the beams. This modulation, when properly detected, forms an interferogram. If the device is properly made, the interferogram should be the cosine Fourier transformation of the spectrum of the input light. Preferably, one varies the interferometric path at a speed such that the interference fringe frequencies lie in the audio range, and this tends to simplify the application of Fourier transform spectroscopy.

Critical to the performance of the device is the drive system used to reciprocate the mirror and therefore vary the interferometric path length. It will be appreciated that the motion of the mirror must preserve its parallelism, i.e., for all positions of the mirror, its reflecting surface must be maintained or aligned always parallel to the same fixed reference plane. The range of fringe frequencies depends on the mirror velocity which during the operative scan should be very linear. The extent of the scan or effective mirror travel displacement establishes the resolution capability of the device. The time interval required for mirror return is inactive time in that the operative scan is usually in one direction; thus, it is desired to provide a system capable of driving the mirror at high velocities at least in return.

Unfortunately, if one wishes to provide a very high resolution instrument involving long scan travel, a number of problems occur. Not only is it difficult to maintain linear speeds over long scans, but the mirror support being larger, will exhibit greater inertia and thus accelerating and decelerating the mirror and support become problems.

It is therefore a principle object of the present invention to provide means for braking the travel of a mirror and support in an interferometer-spectrometer system. A particular object of the present invention is to provide decelerating means of the type described which effects deceleration smoothly and minimizes overtravel of the moving mirror.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Generally, the foregoing objects are achieved in a Michelson-type interferometer-spectrometer having a mirror mounted for substantially linear movement, and including a dashpot for controlling the deceleration of the mirror at least at one end of its stroke. The dashpot comprises a cylinder mounted for movement with the mirror and a fixed piston having at least two passageways communicating between the interior of the cylinder and its outside. The periphery of the piston face is connected to the periphery of the "open" end of the cylinder by a flexible seal. One of the passageways has its exit port at a first position on the piston such that when the cylinder-piston interspace is at or near minimum, the exit port is overlain and sealed off by the flexible seal, yet when the cylinder is withdrawn from the first position so that the interspace or chamber inside the cylinder is enlarged, the flexible seal has also been moved or rolled to a position wherein it no longer covers the exit port. The other passageway is located such that it is never sealed by the flexible seal regardless of the relative positions of the piston and cylinder.

Figure 1:
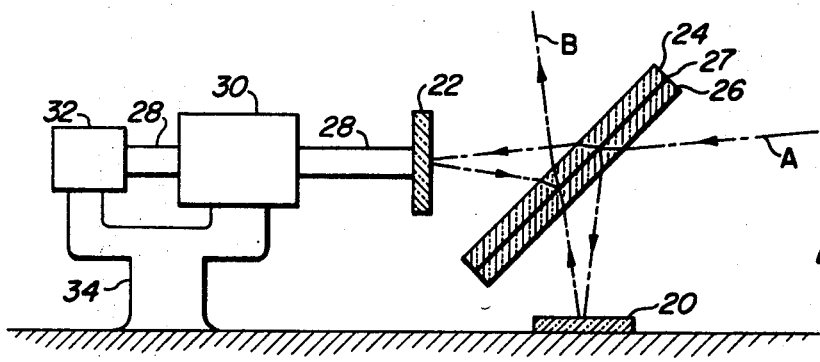
FIG. 1 is a schematic view partly in block form of a Michelson-type interferometer-spectrometer incorporating the present invention.

Referring now to the drawings, in FIG. 1 there is shown an interferometer-spectrometer comprising the usual fixed plane mirror 20 and movable plane mirror 22, the two mirrors being disposed so that their reflecting surfaces are orthogonal. A transparent beam-splitter plate 24 and transparent compensator plate 26 of the same thickness as plate 24 are provided, the two plates sandwiching between them the usual semireflective coating 27 deposited on plate 24. The plates are arranged upon appropriate supports (not shown) so that the planes of the mirror and coating intersect in a common line when mirror 22 is in a zero position intermediate its extreme positions of travel.

Mirror 22 is fixed to shaft 28 for movement with the latter along a line perpendicular to the plane of mirror 22, and motor means, shown generally at 30, are provided for effecting this movement. Decelerating means, shown generally at 32 are provided for selectively controlling the deceleration of the mirror and its supporting shaft, and to this end, a portion of the decelerating means is coupled to shaft 28. Both motor means 30 and decelerating means 32 are mounted on support 34 so that the motor and elements of the decelerating means are fixed with relation to mirror 20.

In operation, light entering the system, shown as ray A is divided by coating 27 into two beams which respectively are directed to mirrors 20 and 22 and returned therefrom back to a common point on coating 27. Rays returning in phase are then emitted as ray B with their amplitudes summed. If the rays return out-of-phase, an appropriate proportion of their energy is returned toward the original source of light. The relative phases of the returned rays, of course, changes with changes in relative path length introduced by motion of mirror 22. Reciprocating the latter by motor 30 as in response to a sawtooth excitation wave will create a series of fringe changes which, as a time-varying pattern, constitute an interferogram.

Instruments of this type usually confine the mirror travel or scan to less than 1 cm., although it is recognized that the longer the scan, the greater the attainable resolution. However, longer scans usually require larger supports, particularly where one wishes to maintain precise linearity of motion; and to operate the device in the same time as the shorter scan systems, one must then move the longer scanning mirror at higher speeds. In order to reduce inactive time, the return stroke of the mirror and support is usually accomplished at yet higher speeds. The reversal of motion, particularly at the end of the very high speed return stroke preceding the beginning of a slower speed scanning stroke, is thus complicated by the higher inertia and speed factors. Hitherto, the deceleration forces necessary to stop the mirror had been provided by simple springs, elastomeric bumpers, and electromechanical brakes. But, these all demanded a substantial portion or overtravel of the returning stroke to provide effectively the requisite smooth braking that would not subject the device to jarring or shock that might perturb the delicate optical alignments.

Figure 2:
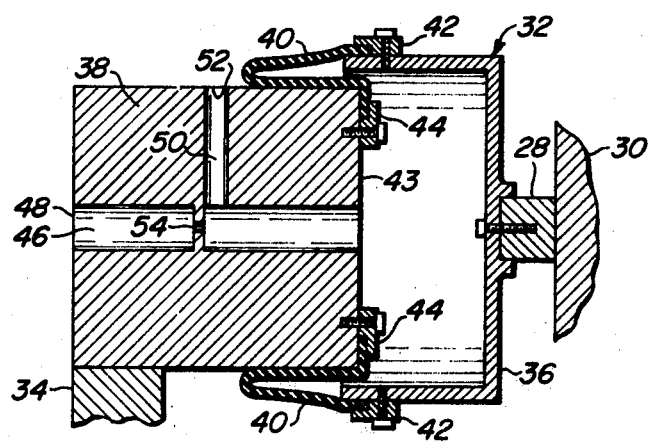
FIG. 2 is an enlarged cross section of the dashpot system employed in the embodiment of FIG. 1, showing the dashpot at one position in the travel of its cylinder.
Figure 3:
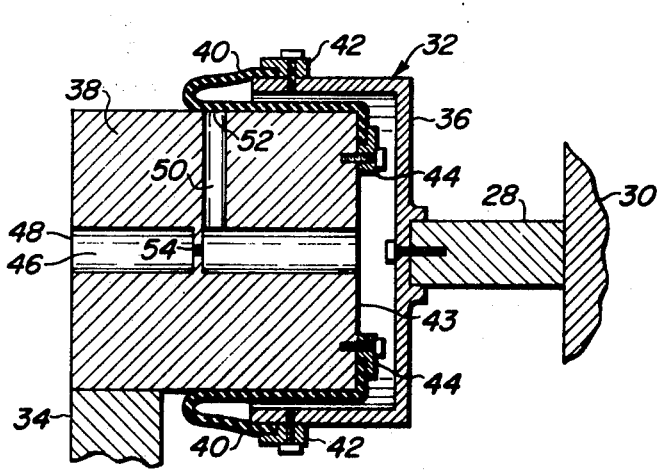
FIG. 3 shows the dashpot of FIG. 2 at another position in its cylinders travel.

The present device therefore as a decelerating or braking means 32 includes a distinctive type of brake in the form of a dashpot shown in detail in FIGS. 2 and 3. The dashpot includes hollow cylinder 36 typically circular in cross section and centrally mounted at its closed end upon shaft 28 so as to be movable axially with the latter. Also included is piston 38 dimensioned to fit loosely within the interior of cylinder 36. Piston 38 typically is fixedly mounted as on support 34 shown only in fragment in FIGS. 2 and 3. The circular periphery of the open end of cylinder 36 is connected to a portion of piston 38 that extends into the cylinder by a flexible, partially everted cylindraceous seal 40. The latter is well known in the art and is typified by those described in the literature of the Bellofram Company of Massachusetts and in U.S. Pat. No. 2,849,026. Seal 40 is connected about the edge of the periphery of the open end of cylinder 36 by appropriate means such as ring clamp 42 and to the edge of the piston face 43 by circular clamp 44.

Piston 38 is provided with a fluid leakage path between face 43 (and thus the interior of the cylinder) and the outside of the piston. This path is shown as passageway 46 extending from face 43 to exit port 48 preferably located adjacent the axis of the piston. Another fluid leakage path is provided between face 43 and a cylindrical side of piston 38. This path which may be, but is not necessarily internally joined to a portion of passageway 46 is shown as passageway 50 extending from a portion of passageway 46 to exit port 52. The relative locations of port 52 and seal 40 are quite important as will be apparent from the following description of the operation of the device.

As shown in FIG. 2, cylinder 32 and piston 38 are comparatively separated (i.e. mirror 22 is moved to the right as viewed in FIG. 1) and it can be assumed that this is the beginning position for the return movement (i.e. to the left) of the mirror. It will be seen that an everted portion of seal 40 lies inside the remainder of the seal and some also lies between the internal cylindrical surface of cylinder 32 and the external cylindrical surface of piston 38. As cylinder 32 moves toward the left, it will try to compress any fluid (either liquid or gas) occupying the interspace between the cylinder and piston sealed by seal 40. This serves then to express the fluid out through both passageways 46 and 50. Preferably, passageway 50 provides a path for leakage of a considerably larger volume of fluid per unit time than does passageway 46 and for this reason, the latter is shown as including restricting orifice 54.

It will be appreciated that with fluid flowing through both passageways with change in the dimensions of the latter, the device in effect operates precisely as an ordinary dashpot which is intended to provide a reaction force proportional to the speed of motion of the cylinder relative to the piston. By providing a relatively easy fluid path through passageway 50 the extent of the reaction force can be made very small so that the cylinder therefore can be driven to high speeds very quickly.

As the cylinder continues to close upon the piston, seal 40 is rolled along the cylindrical periphery of the piston along an axial direction. The rolling motion of the seal then ultimately brings the latter to the position of exit port 52. The closure of exit port 52 by seal 40 as shown in FIG. 3 is thus accomplished in a manner which progressively diminishes the effective cross section aperture of the exit port from fully open to fully closed. As the flow of fluid out of passageway 50 is thus progressively impeded, it will be apparent that the reaction force exerted by the fluid in the cylinder-piston interspace will increase smoothly from the minimal amplitude determined by the combined leakage paths of both passageways to the maximum amplitude determined by the constricted leakage path finally provided only through orifice 54. The motion of the rolling edge progresses axially along the piston at a speed which is half of the relative speed of motion of the piston and cylinder relative to one another. It will be apparent that the reaction forces provided by braking device 32 are not only proportional to the motion of the cylinder but to its position as well.

Motion of the cylinder to the right of course uncovers port 52 so that the cycle can be repeated. Where the scan portion of the cycle is to be carried out at much lower speeds than the return portion, the size of orifice 54 can be set so that for these lower speeds, the reaction forces provided by the restriction of fluid flow in passageway 46 are not difficult to overcome without undue strain on motor 30.

Since certain changes may be made in the above apparatus without departing from the scope of the invention herein involved, it is intended that all matter contained in the above description or shown in the accompanying drawing shall be interpreted in an illustrative and not in a limiting sense.

What I claim is:

1. In an interferometer-spectrometer of the type having a movable mirror, in combination
   means for moving said mirror in reciprocation; and
   means for braking the motion of said mirror toward the end of a cycle of said reciprocation and comprising,
   a hollow cylinder coupled to said mirror for movement therewith,
   a piston fixedly mounted with respect to said cylinder so as to define an interspace between a face of said piston and the interior of said cylinder variable between a maximum and a minimum volume depending upon the extreme positions of travel of said cylinder,
   a flexible cylindraceous seal connected about said piston and mounted about the periphery of said cylinder for movement therewith to provide an everted rolling travel axially along said piston,
   a first passageway for fluid between said interspace and an exit port at the exterior of said piston, said exit port being disposed to be covered and uncovered by said seal at different positions of the latter in its travel along said piston, and
   a second passageway for fluid between said interspace and a second exit port disposed out of the path of travel of said seal.

2. The combination defined in claim 1 wherein the two passageways are dimensioned to permit respectively different fluid flow rates therethrough for the same pressure head on said fluid.

3. The combination defined in claim 2 wherein said first passageway is dimensioned to permit a greater fluid flow rate than said second passageway.